United States Patent
Clark et al.

(10) Patent No.: US 9,026,575 B2
(45) Date of Patent: May 5, 2015

(54) TECHNIQUE FOR AUTOMATICALLY CONFIGURING A COMMUNICATION NETWORK ELEMENT

(75) Inventors: Andrew C. Clark, Succasunna, NJ (US); Philip Diguglielmo, New Providence, NJ (US); Mark H. Kraml, Flanders, NJ (US); Xiong Yang, Berkeley Heights, NJ (US); Xiaoyu Zhou, Morris Plains, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 2632 days.

(21) Appl. No.: 11/529,656

(22) Filed: Sep. 28, 2006

(65) Prior Publication Data

US 2008/0082142 A1 Apr. 3, 2008

(51) Int. Cl.
- G06F 15/16 (2006.01)
- G06F 11/07 (2006.01)
- H04L 29/14 (2006.01)
- H04L 29/06 (2006.01)

(52) U.S. Cl.
CPC ............ *G06F 11/0757* (2013.01); *H04L 69/40* (2013.01); *H04L 69/28* (2013.01); *H04L 69/24* (2013.01)

(58) Field of Classification Search
CPC ..... G06F 11/0757; H04L 69/24; H04L 69/28; H04L 69/40
USPC .................................................. 709/248, 201
See application file for complete search history.

(56) References Cited

U.S. PATENT DOCUMENTS

| | | | |
|---|---|---|---|
| 4,975,904 A | | 12/1990 | Mann et al. |
| 5,167,035 A | * | 11/1992 | Mann et al. ....................... 714/4 |
| 6,219,712 B1 | * | 4/2001 | Mann et al. ................... 709/235 |
| 6,370,656 B1 | | 4/2002 | Olarig et al. |
| 6,633,574 B1 | * | 10/2003 | Koch et al. .................... 370/410 |
| 6,782,489 B2 | * | 8/2004 | Fleming .......................... 714/11 |

(Continued)

FOREIGN PATENT DOCUMENTS

| | | |
|---|---|---|
| EP | 0303830 A2 | 2/1989 |
| JP | H1168821 A | 3/1999 |

(Continued)

OTHER PUBLICATIONS

International Preliminary Report on Patentability for International application No. PCT/US2007/020174 mailed Apr. 9, 2009.

*Primary Examiner* — Krisna Lim
(74) *Attorney, Agent, or Firm* — Carlson, Gaskey & Olds

(57) ABSTRACT

An automatically provisioned network element (26) has the ability to detect a heartbeat message interval used by a remote network element (22, 24) and to automatically adjust a heartbeat interval timer value that it uses for sending subsequent heartbeat messages. The adjustment is responsive to the interval used by the remote network element 50 that they correspond to each other. By automatically configuring the heartbeat timer interval value so that there is correspondence between the intervals used by the end points on a link over which Cisco HDLC SLARP communications occur, for example, the chance of a link being considered to have failed is decreased. In a disclosed example, the heartbeat interval timer value is initially set to a value that is expected to be higher than that used by the remote network element and only automatic reductions in the heartbeat message interval timer value are permitted.

16 Claims, 2 Drawing Sheets

(56) References Cited

U.S. PATENT DOCUMENTS

| | | | |
|---|---|---|---|
| 6,799,276 B1 * | 9/2004 | Belissent | 726/14 |
| 6,820,221 B2 * | 11/2004 | Fleming | 714/31 |
| 6,968,381 B2 * | 11/2005 | Leymann et al. | 709/226 |
| 7,036,013 B2 * | 4/2006 | Renganarayanan et al. | 713/178 |
| 7,415,722 B2 * | 8/2008 | Tateoka | 726/12 |
| 7,490,170 B2 * | 2/2009 | Givoly et al. | 709/248 |
| 7,539,755 B2 * | 5/2009 | Li et al. | 709/225 |
| 7,594,022 B2 * | 9/2009 | Warren et al. | 709/229 |
| 7,856,480 B2 * | 12/2010 | Muchow | 709/208 |
| 2002/0152446 A1 | 10/2002 | Fleming | |

FOREIGN PATENT DOCUMENTS

| | | |
|---|---|---|
| JP | 2004062246 A | 2/2004 |
| JP | 2004208235 A | 7/2004 |
| JP | 2004364168 A | 12/2004 |
| JP | 2006135970 A | 5/2006 |

\* cited by examiner

TECHNIQUE FOR AUTOMATICALLY CONFIGURING A COMMUNICATION NETWORK ELEMENT

FIELD OF THE INVENTION

This invention generally relates to communication. More particularly, this invention relates to automatically configuring a parameter used by a device for communication.

DESCRIPTION OF THE RELATED ART

Various communication systems are known. Recently it has become popular to provide Internet Protocol (IP) access over a variety of serial communication interfaces. One protocol that is useful in this regard is known as the Cisco high level data link control protocol (Cisco HDLC). There are known techniques for using Cisco HDLC to provide low overhead IP access for using wireless or line based communication networks. Cisco HDLC supports the use of multiple links in parallel to obtain high data rates. WAN connections between networks and broadband edge access to an IP base network are examples of uses of Cisco HDLC.

One protocol proposed for use with Cisco HDLC is a protocol called serial link address resolution protocol (SLARP). Cisco HDLC and SLARP are supported by many internet router vendors and manufacturers and are widely supported by telecommunications equipment manufacturers that interface to those network routers.

One feature of the SLARP is that it provides the ability to negotiate the IP addresses of the end points for communication. SLARP also has a heartbeat mechanism to ensure link layer integrity between two network elements. In order to function properly, SLARP requires both ends of a point-to-point connection to be configured identically. Any deviation of configuration causes the communication path to break or fail to be established in the first place.

For example, SLARP has a keep alive protocol dictating that each network element communicating with another sends the other keep alive packets (e.g., heartbeat messages) at a user-configurable interval. The default interval in one example is ten seconds. Both elements must use the same interval to ensure reliable operation. Each system assigns sequence numbers to each transmitted heartbeat message that it sends, beginning with zero, independent of the other element. The sequence numbers are included in the heartbeat messages sent to the other system.

Also included in each heartbeat message packet is the sequence number of the last heartbeat message received from the other system, as assigned by the other element. In one example, this number is called the returned sequence number. Each element keeps track of the last returned sequence number it has received. Immediately before sending a heartbeat message, the element compares the sequence number of the packet it is about to send with the returned sequence number in the last heartbeat message it has received from the other element. In one example, if the two sequence numbers differ by three or more, the line is considered to have failed and the element making that determination will not route any further higher-level data across the link until an acceptable heartbeat message or keep alive response is received.

A simple procedural error like a difference between sequence numbers can cause an outage and a site visit to correct a misconfiguration. This not only presents inconveniences and the appearance of poor performance to customers, but introduces undesirable expenses for those providing communication services because manual intervention is required to correct the problem.

This situation is further complicated because various providers of network elements configure their devices differently at different times. Sometimes a misconfiguration is due to operator error. In any event, it is difficult to manage the configuration requirements for facilitating SLARP communications.

It is desirable to avoid the situation where the communication link is considered to have failed because of unmatching or incompatible device configurations. This invention provides a technique for ensuring appropriate configurations.

SUMMARY OF THE INVENTION

An exemplary method of communicating includes automatically adjusting a first timing interval used by a first network element for sending heartbeat messages over a link responsive to an indication of a second timing interval used by a second network element for sending heartbeat messages over the link.

In one example, a determination is made whether the second timing interval is less than the first timing interval. If so, the first timing interval is automatically reduced to correspond to the second timing interval.

In one example, the first timing interval will only be reduced if the difference between the first and second timing intervals exceeds a preselected threshold.

Using a technique according to this invention increases the likelihood that heartbeat messages will be exchanged between network elements communicating over a link in a manner that will keep the link alive as long as the network elements are sending heartbeat messages for continued communication over that link.

The various features and advantages of this invention will become apparent to those skilled in the art from the following detailed description. The drawings that accompany the detailed description can be briefly described as follows.

DETAILED DESCRIPTION

An example embodiment of this invention includes automatically adjusting a timing interval used for sending heartbeat messages over a link using a serial link address resolution protocol (SLARP). Automatically adjusting the timing interval of one network element to correspond to that used by another network element ensures that heartbeat messages will be exchanged in a manner to avoid link failure that might otherwise occur.

Figure 1:
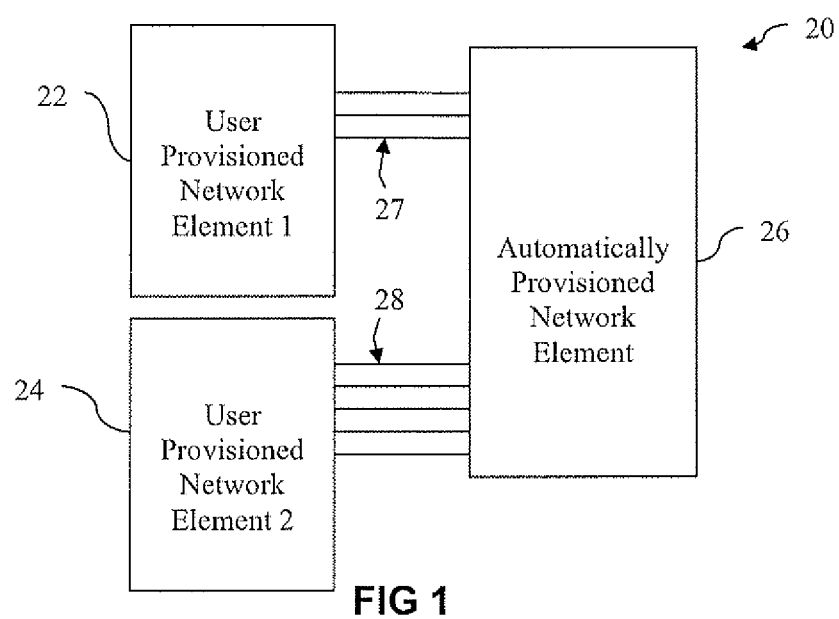
FIG. 1 schematically illustrates selected portions of a communication network useful with an embodiment of this invention.

FIG. 1 schematically illustrates selected portions of a communication network 20. User provisioned network elements (UPNEs) 22 and 24 are configured by a manufacturer or user of the equipment associated with those elements such that they perform in a desired manner. One feature of the UPNEs 22 and 24 is that they have a set timing interval used for sending heartbeat messages over a link used for Cisco high level data link control (HDLC) communications using SLARP. In one example, the timing interval is manually set.

In another example, a program is installed or run and automatically sets the timing interval.

The illustrated example includes an automatically provisioned network element (APNE) 26 that communicates with the other network elements UPNEs 22 and 24 over one or more links. The illustration includes links schematically shown at 27 and 28 for communications between the network element 26 and the network elements 22 and 24, respectively.

One feature of the APNE 26 is that it automatically configures the timing interval used for sending SLARP heartbeat messages over the links 27 or 28 responsive to a heartbeat message timing interval of another network element (e.g., UPNE 22 or 24) with which the APNE 26 is communicating. In one example, the APNE 26 automatically configures the heartbeat message timing interval for individual links. In another example, the heartbeat message timing interval is automatically adjusted for a set of links.

The example network elements 22, 24 and 26 each may be one of a variety of different devices. Example network elements include switching centers, network controllers, routers and base stations. Given this description, those skilled in the art will realize how to design a particular network element or multiple network elements to realize the benefits provided by this invention.

Figure 2:
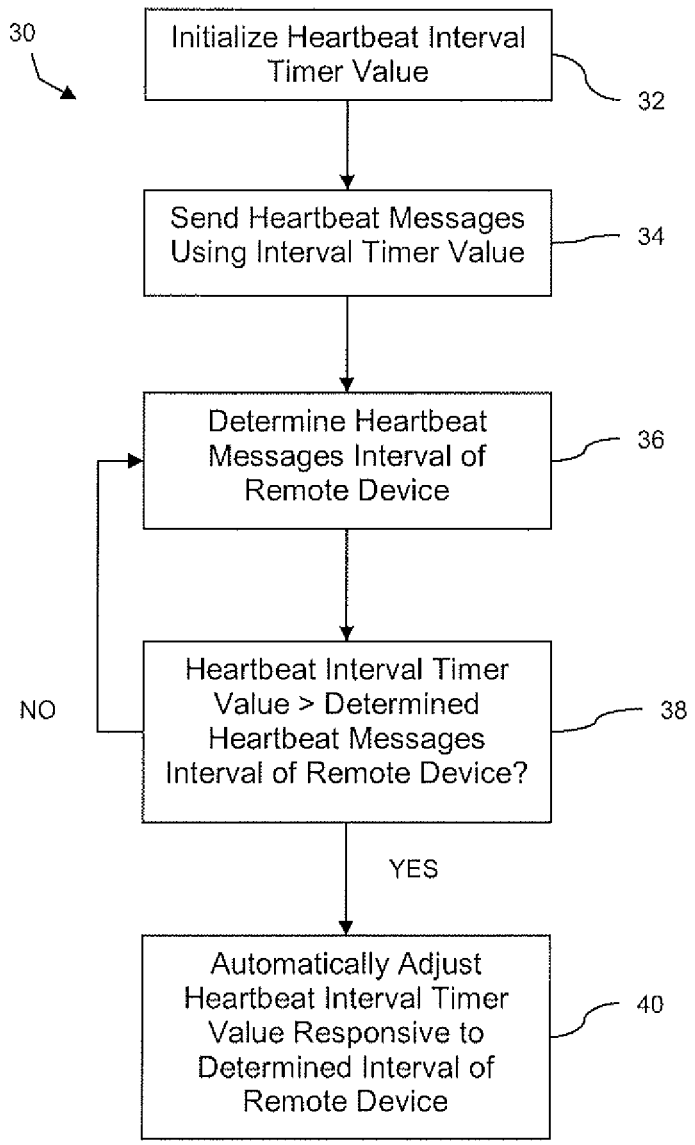
FIG. 2 is a flowchart diagram summarizing one example approach.

FIG. 2 includes a flowchart diagram 30 that summarizes one example approach for facilitating communications where keep alive packets or heartbeat messages are exchanged on a link for keeping a link active.

In one example, the APNE 26 creates all of the defined links according to a defined configuration. All created links are considered to have a "started" status. The link behavior can be defined by one of a plurality of status indicators corresponding to states and causes for transitions. In one example, these behaviors augment the behavior expected from a Cisco HDLC device supporting SLARP.

In one example, each link maintains a status for the connection using that link. In this example, there are four possible states for each link. The "started" state indicates that the APNE 26 has started the Cisco HDLC protocol on that link. In this state, ingress and egress traffic permission are determined by a preselected policy that dictates what choices are made by the APNE 26. In one example, the policy choices are hard coded into the implementation. In another example, the policy choices are user settable parameters.

Another example status of a link is referred to here as the "stop" status. This status is for a link that is not active. A link having the stop status does not allow any egress traffic but allows for ingress traffic according to a preset policy.

Another example link status is referred to here as "up." Such a link has a normal flow of SLARP heartbeat messages in both directions and the link is active. Such a link permits ingress and egress traffic.

Another example link status is "down." Such a link is expecting the normal flow of SLARP heartbeat messages but has detected a failure condition as defined by the corresponding SLARP specification. A link having the "down" status does not permit egress traffic. Ingress traffic may be allowed based upon a preselected policy.

In one example, the APNE 26 monitors all links having the started status to detect a SLARP heartbeat from a remote network element on that link. For example, the APNE 26 can be listening for a heartbeat message from the network elements 22 or 24, depending on which link is being considered at that particular time. When a SLARP heartbeat message is detected on a link, the status of that link is changed from "started" (or "down") to "up." In some examples, when a link is part of a link set, the status of all links within the set may be changed at the same time based upon the determination that one of the links has the "up" status. In another example, each link is treated on an individual basis.

When a link is changed to the "up" state, the APNE 26 sets a SLARP heartbeat interval timer value. This is shown at 32 in FIG. 2. In one example, an initial value assigned to the heartbeat interval timer value is thirty seconds. The APNE 26 then begins to send SLARP heartbeat messages using the interval timer value for controlling the timing of the heartbeat messages. This is shown at 34 in FIG. 2. The first heartbeat message in one example will have a sequence value of zero. Each subsequent heartbeat message will have an incremented sequence value.

While the corresponding link is in the "up" or :""down" state, the APNE 26 continues to emit the SLARP heartbeat messages, incrementing the sequence number value each time that a message is sent according to the initialized interval value.

As shown at 36, the APNE 26 determines an interval used for heartbeat messages from the remote device such as the network element 22, for example. In one example, this determination is made using information regarding the timing of received heartbeat messages from the other network element communicating on that link. A determination is made at 38 whether the heartbeat interval timer value used by the APNE 26 is greater than the determined heartbeat messages interval of the remote device. If so, the APNE 26 automatically adjusts the interval timer value used by the APNE 26. The automatic adjustment is shown at 40 in FIG. 2. In one example, the interval is adjusted to correspond to that used by the remote device. By automatically configuring the heartbeat interval timer value to correspond to that of the remote device, the APNE 26 automatically ensures an appropriate correspondence between the heartbeat messages from the end points on the corresponding link so that the link will remain active as long as communications on that link are desired. In other words, automatically setting the heartbeat interval timer value of the APNE 26 to correspond to the network element that is the other endpoint on a link ensures link layer integrity between the two network elements. The automatic configuration occurring at the APNE 26 provides the type of identical configuration needed to prevent the communication path from breaking or failing to be established in the first place.

Depending on the implementation, the heartbeat interval timer value used by the APNE 26 may be individually set for each link or can be uniformly set for all links in a link set. Given this description, those skilled in the art will realize what arrangement will best meet their particular needs.

In one example, the APNE 26 is capable of communicating over a plurality of links and automatically configuring the heartbeat interval timer value for each link that the APNE 26 is currently using. Even if different heartbeat message intervals are used by different remote network elements, the APNE 26 is capable of maintaining communications with each of them over corresponding links in such an example.

Once the new heartbeat interval timer value is set, the APNE 26 sends any future heartbeat messages using the new timer interval value. Having corresponding timing intervals will, in most cases, ensure that the sequence numbers associated with the heartbeat messages from the two end points will not become spaced apart so far that the link will be considered to have failed.

In one example, an expected heartbeat message interval of a network element is on the order of ten seconds. By initializing the heartbeat interval timer value of the APNE 26 at thirty seconds, there is a high likelihood that the initialized heartbeat interval timer value will be greater than that used by the remote network element device transmitting heartbeat messages on a particular link. This example technique allows for reducing the heartbeat interval used by the APNE 26 when necessary. One example includes only reducing the heartbeat interval timer value and not increasing it in response to a determined difference between the intervals of the end points on a link.

The disclosed example provides the ability for automatically configuring a network element, which allows providers of communication equipment or services to provide link layer protection for HDLC-based networks without the added overhead of configuration mismatch issues. The disclosed example provides the benefit of reducing down time, decreasing cost and simplifying the schedule for network bring-up.

One example use for the example technique is for facilitating backhaul communications between base stations and mobile switching centers for 1XEV-DO revA (with voice over IP) solutions that rely upon the HDLC protocol. In some examples, each base station comprises an APNE.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
   automatically adjusting a first timing interval used by a first network element for sending heartbeat messages over a link responsive to an indication of a second timing interval used by a second network element for sending heartbeat messages over the link, the first network element performing the adjusting;
   automatically adjusting the first timing interval for any link having an active status;
   determining a status of the link based on whether at least one of the first or second network elements is sending the heartbeat messages at a corresponding one of the intervals;
   determining the status of the link to be one of
      started when at least the first network element has started a serial link address resolution protocol on the link;
      stopped when the link is not active; and
      up when the link is active; or
      down when traffic is expected over the link but there has been a failure in communicating the heartbeat messages between the first and second network elements.

2. The method of claim 1, comprising
   determining if the second timing interval is less than the first timing interval; and
   automatically reducing the first timing interval if the second timing interval is less than the first timing interval.

3. The method of claim 2, comprising
   determining a difference between the first timing interval and the second timing interval; and
   automatically reducing the first timing interval only if the determined difference is greater than a preselected threshold.

4. The method of claim 1, comprising
   determining whether at least one of the first or second network elements is communicating over the link;
   initializing the first timing interval to a preselected value; and
   sending a heartbeat message from the first network element with an initial sequence number.

5. The method of claim 4, comprising
   using the first timing interval for sending a subsequent heartbeat message from the first network element with an incremented sequence number;
   determining whether the second timing interval is known at the first network element;
   automatically adjusting the first timing interval to correspond to the second timing interval when the second timing interval is known; and
   using the adjusted first timing interval for sending any next subsequent heartbeat messages from the first network element.

6. The method of claim 1, comprising
   allowing ingress and egress traffic on the link according to a preset policy when the determined link status is started;
   preventing egress traffic on the link and allowing ingress traffic according to a preset policy when the determined link status is stopped;
   allowing ingress and egress traffic on the link when the determined link status is up; and
   preventing egress traffic on the link and allowing ingress traffic according to a preset policy when the determined link status is down.

7. The method of claim 1, wherein the first timing interval is automatically adjusted to correspond to the second timing interval.

8. The method of claim 1, comprising using a serial link address resolution protocol for communicating over the link.

9. A communication network element, comprising
   a message sending portion that sends a plurality of heartbeat messages over a link, the heartbeat messages being separated from each other in time by a first timing interval; and
   a control that automatically adjusts the first timing interval responsive to an indication of a second timing interval used by a second network element for sending heartbeat messages over the link;
   wherein the control
      determines a status of the link based on whether at least one of the first or second network elements is sending the heartbeat messages at a corresponding one of the intervals;
      automatically adjusts the first timing interval for any link having an active status;
      determines the status of the link to be one of
      started when at least the first network element has started the SLARP protocol on the link;
      stopped when the link is not active;
      up when the link is active; or
      down when traffic is expected over the link but there has been a failure in communicating the heartbeat messages between the first and second network elements.

10. The communication network element of claim 9, wherein the control automatically reduces the first timing interval to correspond to the second timing interval.

11. The communication network element of claim 9, wherein the control
   determines if the second timing interval is less than the first timing interval; and
   automatically reduces the first timing interval if the second timing interval is less than the first timing interval.

12. The communication network element of claim 11, wherein the control
   determines a difference between the first timing interval and the second timing interval; and automatically reduces the first timing interval only if the determined difference is greater than a preselected threshold.

13. The communication network element of claim 9, wherein the control determines whether at least one of the first or second network elements is communicating over the link;

initializes the first timing interval to a preselected value; and the message sending portion sends a heartbeat message from the first network element with an initial sequence number.

14. The communication network element of claim 13, wherein the message sending portion uses the first timing interval for sending a subsequent heartbeat message from the first network element with an incremented sequence number;

the control determines whether the second timing interval is known by the control;

the control automatically adjusts the first timing interval to correspond to the second timing interval when the second timing interval is known; and the message sending portion uses the adjusted first timing interval for sending any next subsequent heartbeat messages from the communication network element.

15. The communication network element of claim 9, wherein the control controls traffic on the link by allowing ingress and egress traffic on the link according to a preset policy when the determined link status is started;

preventing egress traffic on the link and allowing ingress traffic according to a preset policy when the determined link status is stopped;

allowing ingress and egress traffic on the link when the determined link status is up; and preventing egress traffic on the link and allowing ingress traffic according to a preset policy when the determined link status is down.

16. The communication network element of claim 9, wherein the control automatically adjusts the first timing interval to correspond to the second timing interval.

* * * * *